United States Patent Office 3,755,515
Patented Aug. 28, 1973

3,755,515
UTILIZING A MAGNETIC FIELD TO RESTRAIN A FERRITE SLURRY DURING PRESSURE FILTRATION AND PARTICLE ORIENTATION
Philip A. Cochardt, Alexander R. Cochardt, and Alexander W. Cochardt, Export, Pa., assignors to Community Building Association of Washington, Indiana, Inc.
Filed Oct. 15, 1970, Ser. No. 80,941
Int. Cl. B28b 5/02; C04b 33/28, 35/26
U.S. Cl. 264—24
11 Claims

ABSTRACT OF THE DISCLOSURE

Highly oriented green ferrite bodies are pressed from a ferrite slurry on a filter cloth between the pole faces of an electromagnet without the use of a restraining oil. Portions of the green ferrites are sintered into superior, anisotropic ferrite permanent magnets. The magnets can be crushed into a powder, and the powder can be mixed with a plastic binder for making a series of novel plastic-bonded ferrite permanent magnets.

During the last decade there has been a rapidly growing production of certain ferrite magnets which are generally described by the formula $MO \cdot 6Fe_2O_3$, wherein M stands for at least one element out of the group Ba, Sr, and Pb. These magnets have been described in numerous patents and other publications. They have become known under the various names ferrite magnets, hexaferrites, ceramic permanent magnets, hard ferrites, magnetoplumbites, etc. In practice, they are today either barium ferrite or strontium ferrite. One of these ferrites is the magnet described in Pat. Re. 26,153. The term hexaferrite or simply magnet will generally be used in this disclosure to describe this and similar materials.

The anisotropic hexaferrites are made employing generally well known ceramic processes but including a step during which the ferrite crystals of the material are preferentially aligned in a predetermined direction. In brief outline the process for making the magnets usually includes the following steps: the raw material comprising oxides or salts that decompose on heating to form oxides, are intimately mixed together: the mixture is presintered at a temperature between 900° C. and 1400° C.; the presintered mass is pulverized and milled in slurry form for a period of hours until a particle size of the order of $1 \mu m$. is obtained; the milled slurry is then pressed into the desired magnet shape in the presence of a magnetic field which aligns the ferrite particles so that the magnets become anisotropic and, simultaneously, a large portion of the liquid in the slurry is removed (the liquid is usually water); the pressed green magnets are then sintered at a temperature between 1000° C. and 1300° C., and the sintered magnets are thereafter ground to size, if necessary, and are then magnetized.

The step of orienting the magnetic particles is of great importance since it is found that the maximum energy product $(BH)_{max}$ of the anisotropic, fully sintered hexaferrite is about four times that of the unoriented magnet. Thus, the maximum energy product of the anisotropic modified strontium ferrite described in the above-mentioned Pat. Re. 26,153 is the order of 4MGOe (megagauss x oersted) compared to only 1 MGRe for the isotropic grade. During the last decade many attempts have been made to simplify or even automate the step of orienting the ferrite slurry in a magnetic field to form anistropic green magnets. This step has usually been by far the most expensive step in the manufacture of the anisotropic, fully sintered hexaferrites. It has been tried to place the ferrite slurry on a flexible stainless steel belt and to pass the belt over a row of magnets inside a drying oven to orient the ferrite crystals. When the water is evaporated, while the ferrite crystals are subjected to a magnetic field, anisotropic green ferrite magnets of irregular shape are formed. Or it has been proposed to place the ferrite slurry between two endless conveyors or continuous filter belts and to squeeze out most of the water and, concurrently, to orient the ferrite crystals by passing the conveyor through a pair of magnetic pulleys. When the oriented filter cake is dried, the cake breaks up into anisotropic green magnets of irregular shape. Although such methods lend themselves to automation, there have been three basic problems with these and similar methods: (a) the density of the green magnets has been inadequate for obtaining superior hexaferrites because the mechanical pressures during orientation have been far too small; (b) green ferrite magnets of large and definite shape could not be made; (c) the magnetic fields obtainable were usually too weak for obtaining complete alignment of the ferrite crystals.

Relatively high mechanical pressures and strong magnetic fields are needed for obtaining superior hexaferrites. The term "strong magnetic field" will be defined here as the magnetic field necessary for maximum alignment of the ferrite crystals. The exact value of the field depends on the characteristics of the ferrite crystals to be aligned. As has been described in the prior art, a field of 3000 oersted is usually adequate for typical barium ferrite and strontium ferrite crystals, but in other cases weaker fields may be adequate. Sometimes much stronger fields are needed, particularly if the ferrite crystals are small and if their intrinsic coercive force is high.

In Pat. No. 3,452,121 there is described a method of making the anisotropic green magnets by pressing the ferrite slurry in a magnetic field in a die arrangement having a filtering path adjacent to a strong field gradient. Anisotropic green magnets with adequate densities can be made in this process because large mechanical pressures are obtainable during the alignment of the ferrite crystals, simply through the action of a hydraulic press. However, this process has not yet found any use because the dies for the molding of the magnets are difficult to make. Also, the area through which the liquid can escape during pressing of the ferrite slurry is small-thus pressing times are relatively long.

In Pat. No. 3,412,461 there is disclosed another method which is widely used today. In this method a highly anisotropic green magnet body having the proper density is made with only relatively small amounts of mechanical and electric power during the pressing and orientation step. The green ferrite magnet body has usually the form of a plate of the order of 0.5 inches in thickness and at least 5 inches as the smallest dimension of its cross section. After pressing and before sintering, the green ferrite plate is cut at high speeds into a plurality of shapes, usually with circular blades having tungsten-carbide teeth. The resulting sintered hexaferrites have the best properties so far obtained with any method of making hexaferrites.

For a better understanding of the present invention, an understanding of certain parts of the method in Pat. No. 3,412,461 is required. The pressing of the ferrite slurry in a strong magnetic field to form the anisotropic green ferrite magnet body is usually carried out essentially as follows: The press operator places the ferrite slurry into a nonmagnetic die onto a lower punch composed of ferromagnetic material, usually hardened tool steel. The ferrite slurry usually consists of ferrite particles of the order of $1 \mu m$. in size suspended in water, with small amounts of dispersing agents and binders added. Die and lower punch are sealed with respect to each other by a gasket arrangement so that the slurry cannot run out between the die and lower punch. The press operator places a paper filter onto the top surface of the die, closing the die opening, and pushes the start button of the hydraulic press. An upper punch of ferromagnetic material, usually hardened tool steel, is brought down and is pressed against the top surface of the die against the paper filter, sealing the slurry inside the die cavity. A strong magnetic field is turned on. The lower punch is moved upwards, pressing the slurry, and squeezing the major portion of the water upwards through the paper filter to form an anisotropic green ferrite plate. The magnetic field is turned off, and a reverse field is turned on to demagnetize the green ferrite plate. The upper punch is moved upwards, and the lower punch is moved upwards to expose the green ferrite plate. The press operater takes the paper filter off the top surface of the green plate and carefully lifts the plate off the lower punch. He throws away the paper filter and pushes a second press button which brings the lower punch down into the starting position for the next pressing cycle.

While beneficial in many respects, this method of pressing and orienting green ferrites has caused a number of problems. First of all, it has not been possible to automate the pressing and orienting operation. One operator has to be used at each press, primarily because no suitable method has yet been found of lifting the relatively fragile, green ferrite plate off the lower punch. Even if carefully lifted by hand, many green ferrite plates break, and the scrap rate has correspondingly been high. Green ferrite plates with more than approximately 12 inches as the largest dimension of the cross section could not yet have been made because such large green ferrite plates can usually not be lifted off the lower punch without breakage. This "lift-off problem" is related to the so-called "sticking problem." The pressed green ferrite plate has a tendency to stick severely to the lower punch. The larger the plate, the more it sticks. Although a soap solution is usually brushed onto the lower punch at the start of each pressing cycle to minimize the sticking, there is still often so much sticking that the plate has to be broken in order to get it off the lower punch.

Another problem with this method is the so-called "gasket problem." Over the years many different gasket arrangements between lower punch and die have been tried out. However, no gasket arrangement has been found that can withstand the high pressure and the abrasiveness of the slurry for more than about one day. A leaky gasket usually results in scrap magnets. This means that gaskets have to be replaced, usually once every day, which has caused considerable loss in production time and has resulted in a relatively large scrap rate.

Another problem in the die problem. The first dies were made out of type 304 stainless steel, but it was soon found that such steel would wear readily along those portions that are in contact with the ferrite slurry. Therefore, it was found necessary to place carbide-inserts into the die which have made the dies extremely expensive in view of the accurate dimensions and the diamond grinding required for getting the proper gasket fit, the required clearance between lower punch and die being only a few mils.

Another problem with this method is the long pressing time, one pressing cycle being usually of the order of two minutes. This is due to filtering taking place only upwards through the upper surface of the pressed plate. The long pressing times have significantly contributed to the high cost of making such magnets. In order to make a large number of ferrite plates, many presses with many press operators with many expensive dies with many high-current power supplies, etc. are required. Needless to say, the pressing and orienting step has been by far the most expensive operation in the manufacture of such magnets.

It is the primary object of this invention to provide a method for pressing highly anisotropic ferrite magnets in an automated pressing cycle thus drastically reducing the labor cost in the manufacture of ferrite magnets.

It is another object of this invention to provide a method for producing highly anisotropic ferrite magnets that can be pressed without a die, thus substantially lowering the equipment cost in the manufacture of ferrite magnets.

It is a further object of this invention to provide a method of pressing highly anisotropic ferrite magnets in larger sizes than was possible before.

Another object of the invention is to provide a method of pressing highly anisotropic ferrite magnets in a shorter time than was possible before.

A still further object of this invention is to provide a method of making superior plastic-bonded magnets.

Other objects of the invention will, in part, be obvious and will, in part, appear hereafter. For a better understanding of the nature and objects of this invention reference should be had to the following detailed descriptions and drawings, in which:

Figure 1:
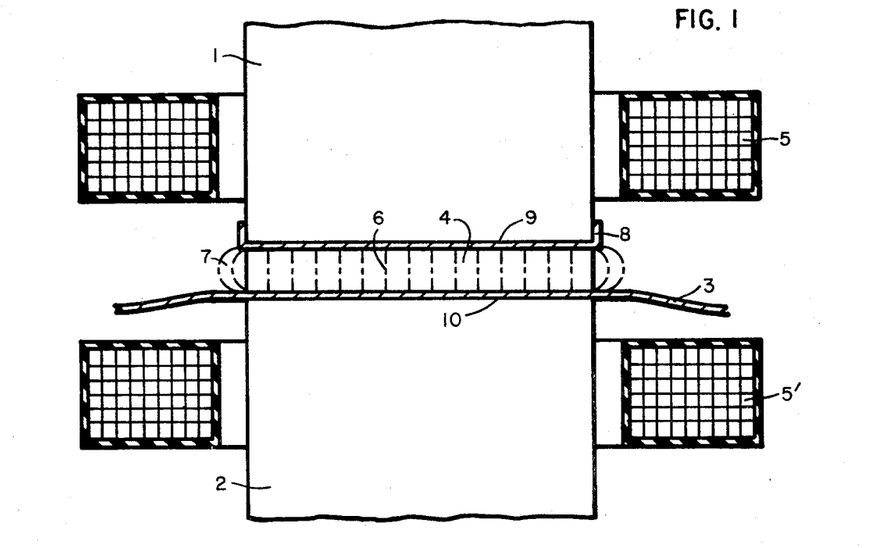
FIG. 1 is a schematic diagram, partially in cross section, of a pressing and orienting apparatus arranged for making magnets of the invention.

Referring to FIG. 1 there is shown an apparatus suitable for the production of a green ferrite compact. An upper pole piece 1 and a lower pole piece 2 of an electromagnet are shown with a filter cloth 3 in the gap 4. Two coils 5 and 5' are shown in part in cross section. These coils have the function of establishing the orienting magnetic field, the lines of force of which are shown schematically in the gap at 6. It will be noted that the lines of force are generally straight in the gap and are curved only at the edges 7 in the socalled "fringe field volume." An upper filter 8 is fastened to the upper pole piece 1. Filter cloth 3 is larger than the pole faces 9 and 10.

FIG. 1 is essentially identical to FIG. 1 of Pat. No. 3,412,461 except that it contains a filter cloth and no die. Surprisingly, we have found that the expensive die, which has caused so many problems, is not needed. Likewise, no gaskets are needed.

The process for making the magnets of the invention will be described with particular reference to FIGS. 1 through 4.

In operation, only pole piece 2 is movable. This is accomplished, for example, through the action of a bottom hydraulic cylinder (not shown) because the required relatively large forces between pole pieces 1 and 2 are easily obtained in this manner. The ferrite slurry can be pumped through a MOYNO pump or other sutiable slurry pump (not shown) onto the filter cloth 3 into or in front of gap 4. The filter cloth 3, which can be part of a long belt, is movable essentially parallel to the pole faces 9 and 10 through means not shown. After the MOYNO pump has been deenergized and the filter moved into the gap if slurry is fed in front of the gap, the distance between the pole faces 9 and 10 is reduced by moving pole piece 2 upwards pressing out the major portion of the liquid of the slurry through the filter cloth 3, the upper filter 8, and through the slurry that is extruded into the fringe field volume 7. Simultaeously with the pressing action, the coils 5 and 5' are energized producing the magnetic field indicated at 6 and 7 which operates to orient the ferrite particles. Following the pressing and orienting operation, the distance between the pole faces 9 and 10 is increased by moving back pole piece 2, exposing the green ferrite body. The filter cloth 3 is moved through means not shown, transporting the green ferrite body out of the gap.

Figure 2:
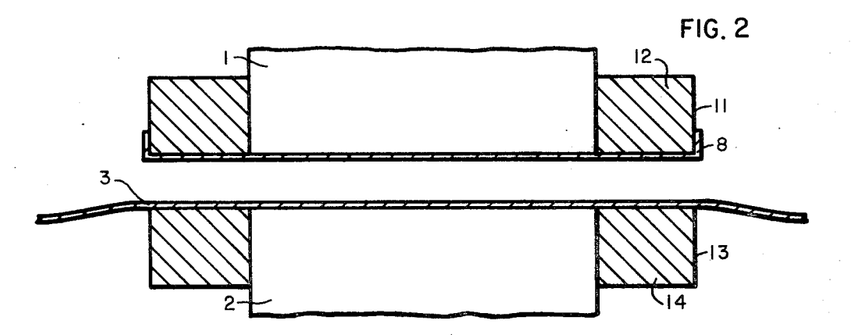
FIG. 2 is a schematic diagram of a modification of the apparatus of FIG. 1.
Figure 3:
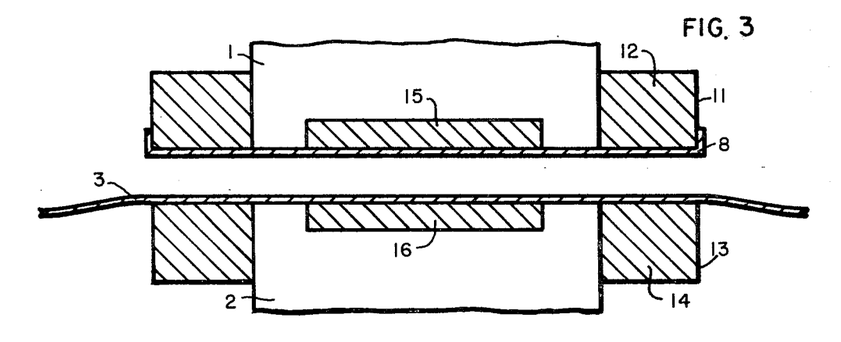
FIG. 3 is a schematic diagrram of still another modification of the apparatus of FIG. 1.
Figure 4:
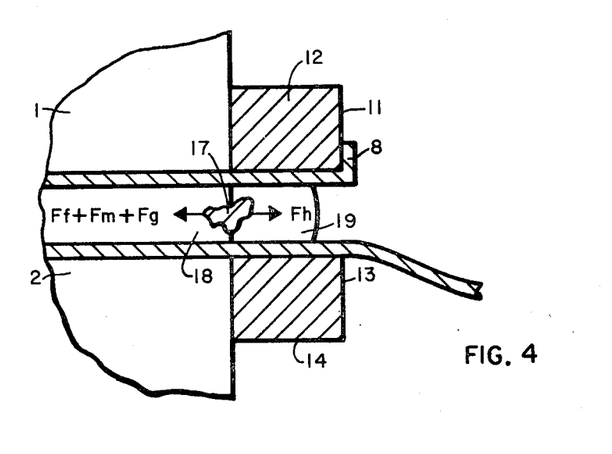
FIG. 4 shows an enlarged portion of FIG. 2 with an illustration of the forces acting on a ferrite particle.

While only pole piece 2 is used for the pressing with pole piece 1 stationary, it will be understood that pole piece 1 could be used for the pressing with pole piece 2 stationary. Or both pole pieces could be movable. In order to reduce the amount of slurry that is extruded into the fringe field volume, various different upper and/or lower pole structures can be used. As is illustrated in FIG. 2, the upper pole structure 11 may contain a frame 12 fastened to the upper pole piece 1. Likewise, the lower pole structure 13 may contain a frame 14. Frames 12 and 14 can be made out of a nonmagnetic material, such as brass or 304 stainless steel. As indicated in FIG. 3, there may be nonmagnetic inserts 15 and 16 in the upper and lower pole structures. These serve to increase the strength of the fringing field. While only nonmagnetic frames and nonmagnetic inserts are indicated, it is understood that the pole structures may contain other such nonmagnetic structural components which function to improve the pressing action.

The term "pole piece" as used here refers to, as it generally does, a ferromagnetic structure adjacent to a nonmagnetic gap. As is apparent from the above description, the term "pole structure," on the other hand, is used here more broadly because a pole structure may contain, in addition to the usual ferromagnetic components, certain nonmagnetic structural components, such as nonmagnetic frames, nonmagnetic inserts, etc. as indicated in FIGS. 2 and 3. The term "pole face" as used here refers to, as it generally does, the ferromagnetic portion of the area of the pole structure facing the nonmagnetic gap.

We have discovered that excellent green ferrite bodies with proper densities and alignment can be pressed in the arrangements of FIGS. 1 through 3 without a die directly onto a filter cloth. To explain why this is possible, reference is made to FIG. 4 which shows an enlarged portion of FIG. 2. A ferrite particle 17 is indicated which for a better understanding has been enlarged several orders of magniture (the actual ferrite particle size in usually of the order of 1 $\mu$m). To the left of the ferrite particle 17 is the slurry portion 18 inside the gap; to the right the slurry portion 18 extruded into the fringe field volume. Ferrite particle 17 does not move because the mechanical force $F_h$ resulting mainly from the hydraulic cylinder that pushes pole piece 2 upwards is canceled out by the forces $F_f + F_m + F_g$ where $F_f$ is a friction force, $F_m$ the magnetic force exerted by the slurry portion 19 and $F_g$ the magnetic force exerted by the field gradient $dH/dx$. Force $F_g$ can be expressed as follows: $F_g = MVdH/dx$ where M is the magnetization of the ferrite particle and V its volume. Unlike the method of Pat. No. 3,452,121, which is based on the field gradient force $F_g$, the present invention is based on the magnetic force $F_m$ which is far greater than the field gradient force $F_g$. To put it in another way, the present invention resides in the discovery that the major portion of the slurry stays in the gap and can be pressed and oriented into a highly anisotropic, dense green ferrite body because of a small portion of the slurry that is extruded into the fringe field volume. When the coils are energized, the slurry in the fringe field volume is trying with great force to get back into the gap. This force together with the friction force (force $F_g$ can be neglected) explains why the present method works.

In order for the method of the invention to work most satisfactorily, it is important that the force between pole pieces 1 and 2 be applied slowly and gradually. When the coils 5 and 5' are energized, there is a sudden, large additional force between pole faces 9 and 10. This force in lbs. is approximately equal to $0.5AB^2$ where A is the area of the pole face in square inches and B the flux density in kilo-gauss. For example, if the pole face is 24 inches x 24 inches square and if the flux density is 10 kilo-gauss, this sudden force is 30,000 lbs. What is even worse, B increases as the distance between the pole faces decreases. With no slurry in the gap and with the usual hydraulic press, the bottom pole structure lifts off, when the coils are energized, and flies with great force against the upper pole face. This means that, in order to prevent excessive extrusion of slurry into the fringe field volume, pole pieces 1 and 2 have to be prevented from moving too fast toward each other. We have found a simple solution to this problem. With the pole piece 1 stationary and pole piece 2 being pushed upwards by a hydraulic cylinder, the sudden "lift-off" can be prevented simply by fastening a heavy weight to the bottom pole structure, the heavy weight counteracting the magnetic attraction force. The weight should be at least equal to $0.5AB^2$. Of course, other forces can be used to counteract the magnetic attraction force, such as two oppositely arranged, counteracting hydraulic jack cylinders mounted between floor and bolster.

Figure 5:
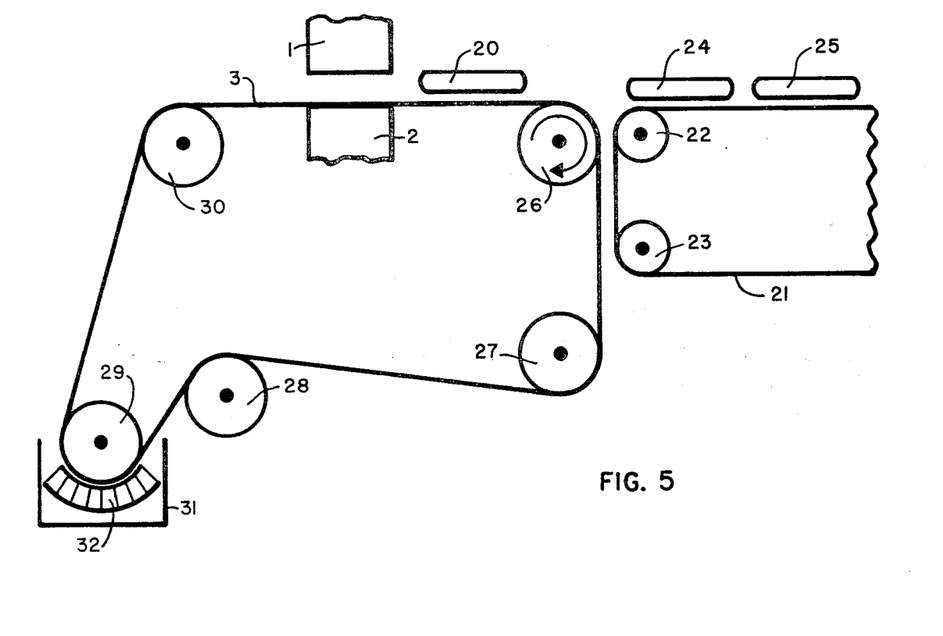
FIG. 5 is a schematic diagram of a continuous, self-cleaning filter belt to be used with the apparatus of FIG. 1.

The filter cloth 3 is preferably part of a continuous, self-cleaning filter belt as is indicated in FIG. 5. The green ferrite bodies, such as 20, are transported out of the gap at the end of the pressing cycle. They can then be transferred onto the rubber belt 21, part of which is shown, having pulleys 22 and 23. The transferred green ferrite bodies 24 and 25 are transported to the slicer, to a drying oven, or directly into the kiln. One pair of drive sprockets 26 and four pairs of idler sprockets 27, 28, 29 and 30 can be used to transport the filter belt through the washing tank 31 with brushes 32.

Tests have shown that the characteristics of the green ferrite bodies depend primarily on the liquid content of the slurry prior to pressing, the rate at which pressure is applied, the end pressure, the strength of the magnetic field in the gap, the distribution of the fringing field, and the geometry of the upper and lower pole structures, particularily the location of frames 12 and 14. It is desirable to press and orient the green ferrite bodies in a completely automated fashion, in a short cycle, and with the least amount of equipment. It is further desirable to find a use for the entire green ferrite magnet body, including the portion formed in the fringe field volume.

The liquid content of the slurry must be low in order to make force $F_f$ large; but if too low, the ferrite crystals will not align properly. The liquid component of the slurry is usually water, but alcohol and other organic solvents can also be used. The liquid content of the slurry will be expressed herein vol. percent water because water was used to determine the relationship between the quality of the magnets and the liquid content of the slurry. The preferred slurry has a "soft ice cream consistency" and contains approximately 70 vol. percent water. In the preferred method of this invention, the slurry must contain between 55 vol. percent and 95 vol. percent water. As will be understood from the examples given below, the term slurry as used here includes mixtures of ferrite and liquid that have the consistency of a "soft mud" or even "hard mud." Such slurries contain approximately 50 to 60 vol. percent water. They can be pressed more rapidly in the method of the invention than the slurries with 70 vol. percent water, but they are usually difficult to meter. Slurries with more than 95 vol. percent water are generally excluded because such slurries are too difficult to press in the method of the invention.

The preferred rate, at which pressure is applied to the slurry, is of the order of 100 p.s.i./sec. up to 500 p.s.i. After 5 sec. and at 500 p.s.i. pressure, force $F_f$ has usually become so large that additional pressure, if needed, can be applied at a much higher rate. The term pressure will be defined here as the total force acting between the two pole structures divided by the average of the upper and lower pole face area. Since the upper pole structure is usually stationary and since the areas of the upper and lower pole faces are usually the same, the pressure can usually be calculated from the expression $$F_h/A - W/A + 0.5B^2$$

where $F_h$ is the force exerted by the bottom hydraulic cylinder, W the total weight of the bottom pole structure, including the counteracting weight, B the flux density in the gap, and A the area of the bottom pole face. The preferred end pressure is between 500 p.s.i. and 10,000 p.s.i. The properties of the green ferrite bodies deteriorate at end pressures below 500 p.s.i. At end pressures above 10,000 p.s.i., no improvement in the properties of the green ferrite bodies is observed, but the life of the filter cloth may become adversely affected.

The strength of the magnetic field in the gap should be as high as possible because we have found that the magnetic force $F_m$ increases with the strength of the field. Preferably, fields should be stronger than those now used in the manufacture of anisotropic hexaferrites. We have found that fields of 10,000 oersted can easily be obtained for the method of the invention by concentrating the flux in the pole structures and by making coils 5 and 5' out of thick-walled copper tubing with room temperature water flowing through the tubing. However, fields as low as 2000 oersted can be used for barium and strontium ferrite in the method of the invention without significantly reducing the properties of the green ferrite body. Of course, as is often the case with electromagnets, only one coil can be used instead of two coils. Also, the electromagnet may have more than two poles.

The distribution of the field in the fringe field volume should be such that the field is as high as possible. After many tests, we have found the arrangement illustrated in FIG. 6 to be particularly useful. The magnetic flux is concentrated toward the pole faces 9 and 10, thus providing stronger magnetic fields at the same level of electric power. Ordinary low-carbon steel can be used for the ferromagnetic portions of the pole structures because the steel does not come in contact with the slurry. The nonmagnetic frame 12 fills the recess in the one pole structure 11. The other pole structure 13 is movable vertically through the action of a large bottom hydraulic cylinder (not shown). The nonmagnetic frame 14, which fits loosely around the bottom pole structure, is movable vertically through the action of a small hydraulic cylinder (not shown). The clearance between the bottom pole structure 13 and the frame 14 is approximately ¼ inches. The bottom pole piece 2 has a radius of curvature at 33 and 34 of approximately ¼ inch which has the effect of increasing the life of the filter cloth 3. The pressing and orienting process is completely automated. Slurry is pumped onto the filter cloth 3 while the bottom coil 5' is shortly energized pulling the filter cloth down onto the pole face 10.

Figure 6:
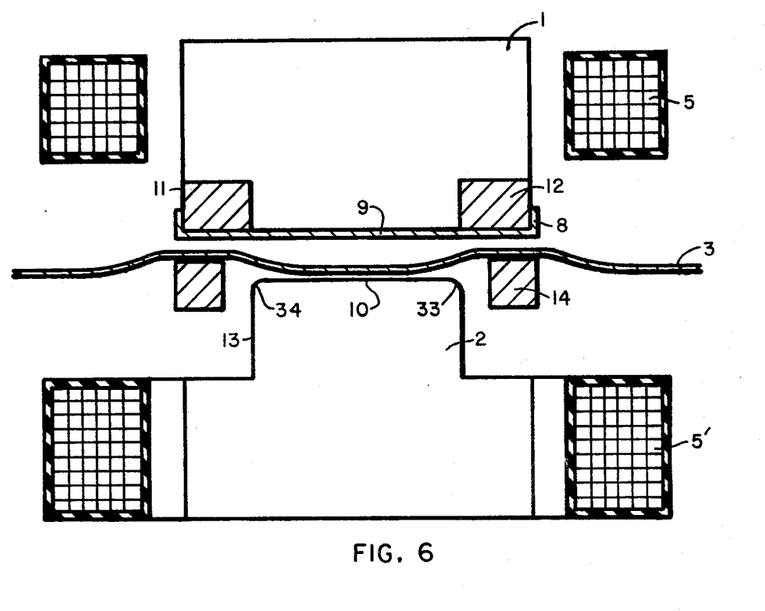
FIG. 6 is a schematic diagram of another modification of the apparatus of FIG. 1.

The frame 14 is moved upwards against the upper pole structure sealing the slurry to some extent. The distance between the pole structures is reduced by moving pole structure 13 upwards, at the same time energizing coils 5 and 5'. A major portion of the water of the slurry is pressed out through the filter cloth 3 and the filter 8, and a green ferrite body is formed. Coils 5 and 5' are de-energized. If needed, the green ferrite body is demagnetized through a short current pulse through an auxiliary coil (not shown) or through a reverse current through coils 5 and/or 5' while still being held at the end pressure. The frame 14 is moved back downwards, and the distances between the pole structures is increased by moving the bottom pole structure downwards about halfway. The filter belt is energized moving the filter cloth 3 with the green ferrite body out of the gap. After the bottom pole structure 13 is lowered to the starting position, the next cycle starts.

Pole pieces 1 and 2 and frames 12 and 14 preferably have rectangular cross section. This minimizes the cost of construction of the pole structures and allows for the pressing of the maximum size of green ferrite body in a given hydraulic press. But it is understood that pole pieces and frames of other forms can be used, such as those having round sections.

Frame 14 functions to increase forces $F_f$ and $F_m$, to position the filter cloth 3, and to provide a green ferrite body of reproducible shape. But frame 14 is very unlike the die in the process of Pat. No. 3,412,461 because frame 14 does not have to withstand any large forces and because it never comes in contact with the slurry. Frame 14 is simply bolted together from readily available brass or 304 stainless steel rectangular bar. No accuracy and no machining is necessary. Thus the cost of constructing the frame is far lower than that for the die in the process of Pat. No. 3,412,461.

We have tested several dozen different filter materials for the method of the invention, particularly for the arrangement of FIG. 6, with respect to durability, time of pressing, ease of magnet body discharge, ease of washing, depth of filter impressions on the magnet surface after sintering, etc. We found that a filter cloth, known as "Polypropylene Multifilament Cloth Style 7096" is particularly suitable for the filter cloth 3. This cloth is relatively inexpensive, porous, and strong. Its thickness is only 0.030 inch. The green ferrite magnet body comes off easily from this cloth. No amount of wear was noticeable after about one thousand pressings at 6000 p.s.i. We found also that a polyester cloth, known as "Travira 1966" is most suitable for the filter 8 when backed up by a "Dacron Felt 61–DA20." With this filter arrangement on the upper pole structure, an upper filter belt is not needed. Of course, it is understood that other filter materials can be used for the filter cloth 3 or the filter 8, such as the nylon and Dacron cloths now widely used for filtering clay slurries. The term filter cloth as used here covers all filter materials that can be used for the process of the invention, including other plastic cloth, such as Dynel, plastic screens, cotton, and metallic wire screens.

When the process of the invention is compared with the prior-art processes, in which ferrite crystals are continuously oriented on a stainless steel belt in a magnet oven or between filter belts between magnet rolls, it is noted that, unlike with these prior-art processes, the high pressures needed for making superior ferrite magnets are easily obtained. Also, large, thick, and highly anisotropic green ferrite bodies can be made which is not possible with the continuous prior-art processes. When compared with the process of Pat. No. 3,412,461, it is noted that essentially all problems with this process have now been eliminated. Highly anisotropic, green ferrite bodies can now be pressed and oriented in a completely automated cycle without a die, without gaskets, etc. Actual pressing times are now only of the order of 15 seconds—much shorter than before. Unlike with the method of Pat. No. 3,412,461, filtering takes place along the top and bottom surfaces as well as along the sides, the slurry being completely contained from all sides in filters if the arrangement of FIG. 6 is used. There is no sticking on metallic surfaces because the slurry and the green ferrite magnet body never come in contact with metallic surfaces. Very large magnets can now be made because of the ease with which the green ferrite body is transported out of the gap.

Figure 7:
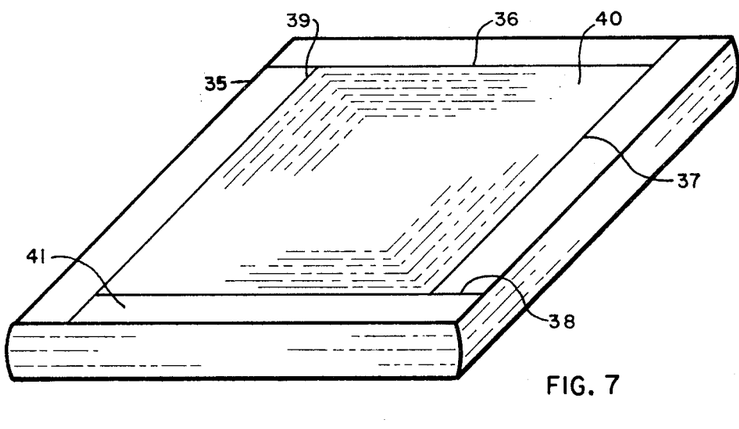
FIG. 7 shows a green ferrite body.

A green ferrite body 35 is illustrated in FIG. 7. It may be subdivided along the lines 36, 37, 38, and 39, preferably by cutting at high speeds with thin, carbide-tipped circular saw blades. In this manner, the highly oriented central portion 40 can be cut out and separated from the end portions 41 in which the ferrite crystals are oriented along curved lines. The central portion 40 can be further processed using the operations already described in detail in Pat. No. 3,412,416. The end portions can be discarded. Or they can be mixed with water to make new slurry, and the slurry can be pressed and oriented to form new green ferrite bodies. However, in the preferred method of the invention, the end portions are used for making novel and superior ferrite magnets.

We have discovered that, when the end portions 41 are sintered and crushed to a powder passing through a 10-mesh screen, each powder particle exhibits properties approaching those of a perfect single crystal, the properties being equal or superior to those of any other ferrite powder currently known. Although the ferrite crystals are misaligned in the end portions within an angular range of 10° or more, the crystals in each individual powder particle after sintering and crushing are aligned in parallelism within approximately 1° if the powder passes through a 10-mesh screen. Such particles can be considered to be single crystals for all practical purposes. The term 10-mesh screen refers here, as it usually does, to a screen No. 10 of the U.S. Standard Sieve Series which has an opening of 2.0 mm.

There are many applications for the novel ferrite single-crystal powders. They can be mixed with flexible binders, such as sulfonated polyethylene, natural rubber, polyvinylchloride, etc. The mixtures can be calendered into flexible magnet sheet or extruded into flexible magnet strip. Such flexible magnets are greatly superior to those now widely used, for example, in refrigerator door gaskets, kitchen cabinet doors latches, electrical tooth brushes, magnetic black boards, etc. Or the novel ferrite single-crystal powers can be mixed with an epoxy resin and an epoxy catalyst, the mixtures pressed in a magnetic field, and the pressed compacts cured in an oven. Such rigid, oriented, plastic-bonded magnets have even better properties than the flexible magnets. They can be made at low cost within very close tolerances and in complicated shapes, such as thin rings, arcs, etc. which is not possible with the fully sintered, oriented magnets.

Or the novel ferrite single-crystal powders of this invention may be used as an additive to the ferrite slurries in the manufacture of the fully sintered magnets. We have found that the green ferrite magnets shrink substantially less if they contain at least 10 wt. percent of the novel ferrite single-crystal powder. Because of the lower shrinkage, faster firing cycles can be used, less finishing operations are required, and/or closer tolerances can be obtained. For example, a green magnet shrinks only approximately half as much during sintering if it contains 50 wt. percent of the novel ferrite single-crystal powder and 50 wt. percent of the regular presintered powder instead of, as is usually the case, 100% of the presintered powder. Another benefit derived from additions of the novel ferrite single-crystal powders to the slurry is the much shorter pressing time. This will be understood from a study of the expressions for the magnetic forces which are considerably higher when the novel ferrite single-crystal powder is added to the slurry because its magnetization as well as its volume is considerably higher than those for the presintered powders regularily used.

In order that the invention may be more clearly understood, a number of examples of the practice of the invention are now offered.

EXAMPLE 1

Figure 8:
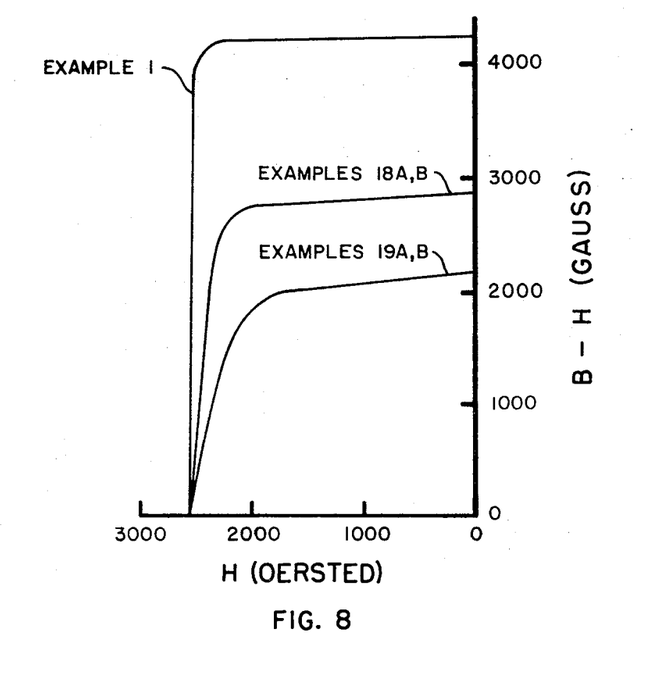
FIG. 8 shows the demagnetization curves of a fully sintered magnet, of oriented, plastic-bonded magnets, and of unoriented, plastic-bonded magnets.

Strontium ferrite slurry was prepared essentially as described in Example II of Pat. Re. 26,153. The slurry was dewatered by evaporation until it had a "soft mud consistency" and contained 60 vol. percent water. The slurry was placed on a large polypropylene filter cloth into the gap of the electromagnet arrangement illustrated in FIG. 2. The upper filter 8 was made up of a Travira cloth backed by a Dacron felt and was fastened to the upper pole structure. The weight of the bottom pole structure plus attachments divided by the bottom pole face area was 130 p.s.i. This was accomplished by fastening two beams across the bottom plates of the hydraulic press and by constructing a platform between the beams on each side, with heavy weights mounted on the platform. A magnetic field having a strength of 10,500 oersted (measured in the center of the gap) was turned on and, at the same time, the bottom pole structure was moved upwards through the action of a bottom hydraulic cylinder. Pressure was applied to the slurry at an average rate of 80 p.s.i./sec. until a pressure of 1700 p.s.i. was reached, thereby pressing out a large portion of the water to form a green ferrite body which had a water content of approximately 40 vol. percent and a thickness of approximately 0.5 inch. The field was turned off, and the green ferrite body was demagnetized. The bottom pole structure was moved downwards, and the polypropylene filter cloth with the green ferrite magnet body was moved out of the gap. The central portion 40 (see FIG. 7) of the green ferrite body was cut with a carbide-tipped circular saw blade and after drying was sintered for 2 hrs. at 1240° C. On cooling to room temperature, the hysteresis loop of the magnet was determined. FIG. 8 shows the second quadrant. The remanence was $B_r=4280$ gauss, the coercive force $H_{cI}=2600$ oersted, and the maximum energy product $(BH)_{max}=4.5$ MGOe. These values are identical within the error of measurement to the values obtained with the much more expensive process of Pat. No. 3,412,461.

EXAMPLES 2 THROUGH 6

The following five examples are offered in order to show the effect of the end pressure on the properties of the sintered magnets made in accordance with the method of the invention. Sintered magnets were made precisely as in Example 1, except that the end pressure was varied between 400 p.s.i. and 10,000 p.s.i. Table I gives the results of the magnetic tests.

TABLE I.—EFFECT OF END PRESSURE

| Example | End pressure (p.s.i.) | B (gauss) | $H_{cI}$ (oersted) | $(BH)_{max.}$ (MGOe) |
|---|---|---|---|---|
| 1 | 1,700 | 4,280 | 2,600 | 4.5 |
| 2 | 1,000 | 4,260 | 2,700 | 4.4 |
| 3 | 700 | 4,170 | 2,850 | 4.1 |
| 4 | 400 | 3,810 | 2,950 | 3.3 |
| 5 | 6,000 | 4,290 | 2,650 | 4.5 |
| 6 | 10,000 | 4,290 | 2,700 | 4.5 |

Figure 9:
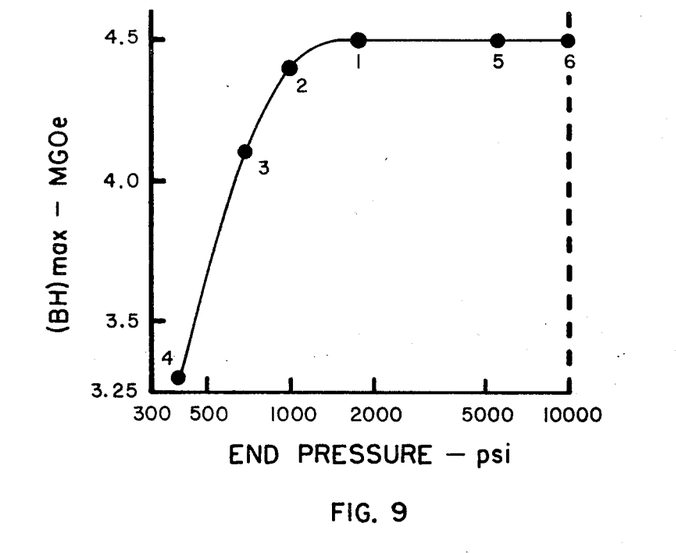
FIG. 9 is a plot of maximum energy product of the fully sintered magnets as a function of the end pressure during the pressing and orienting step.

In FIG. 9 the maximum energy product $(BH)_{max}$ of the sintered magnet is plotted against the end pressure on a semi-logarithmic scale. The number refer to the number of the example.

It is noted that the properties of the magnets rapidly deteriorate at end pressures below 500 p.s.i. The dashed line at an end pressure of 10,000 p.s.i. indicates the maximum end pressures recommended for the method of this invention because difficulties with the filter cloth are anticipated and because no further improvement in properties is noticed if the end pressure is above 10,000 p.s.i. Therefore, the method of the invention should preferably be practiced using end pressures between 500 p.s.i. and 10,000 p.s.i.

EXAMPLES 7 THROUGH 10

The following four examples are offered to show the effect of the strength of the magnetic field on the properties of the sintered magnets and, also, on the rate at which pressure can be applied to the slurry when pressing a green ferrite body having a thickness of approximately 0.5 inch. Sintered magnets were made precisely as in Example 1, except that the field strength was varied and that for Example 10 the weight of the bottom pole structure plus attachments was doubled in order to counteract the much larger magnetic attraction force between the pole faces. The results are seen in Table II.

TABLE II.—EFFECT OF FIELD

| Example | Rate of pressing (p.s.i./sec.) | Magnetic field (oersted) | $B_r$ (gauss) | $H_{ci}$ (oersted) | $(BH)_{max}$ (MGOe) |
|---|---|---|---|---|---|
| 1 | 80 | 10,500 | 4,280 | 2,600 | 4.5 |
| 7 | 30 | 3,000 | 4,190 | 2,750 | 4.2 |
| 8 | 18 | 2,000 | 4,060 | 2,850 | 3.9 |
| 9 | 11 | 1,000 | 3,860 | 2,900 | 3.5 |
| 10 | 110 | 15,000 | 4,300 | 2,500 | 4.5 |

It is noted that the properties deteriorate at fields of less than 2000 oersted and that the field should be as strong as possible in order to simplify the pressing operation.

EXAMPLE 11

A sintered magnet was made precisely as in Example 1, except that the arrangement illustrated in FIG. 6 was used. The upward clamping force on frame 14 was approximately 1/20 of the upward pressing force $F_h$. Pressure could be applied to the slurry at a rate approximately two times larger than in Example 1. The remanence of the sintered magnet was $B_r=4260$ gauss, the coercive force $H_{ci}=2650$ oersted, and the maximum energy product $(BH)_{max}=4.4$ MGOe. As expected, the frame 14 does not affect the magnetic properties of the central portion of the green ferrite magnet body.

EXAMPLES 12 THROUGH 16

Figure 10:
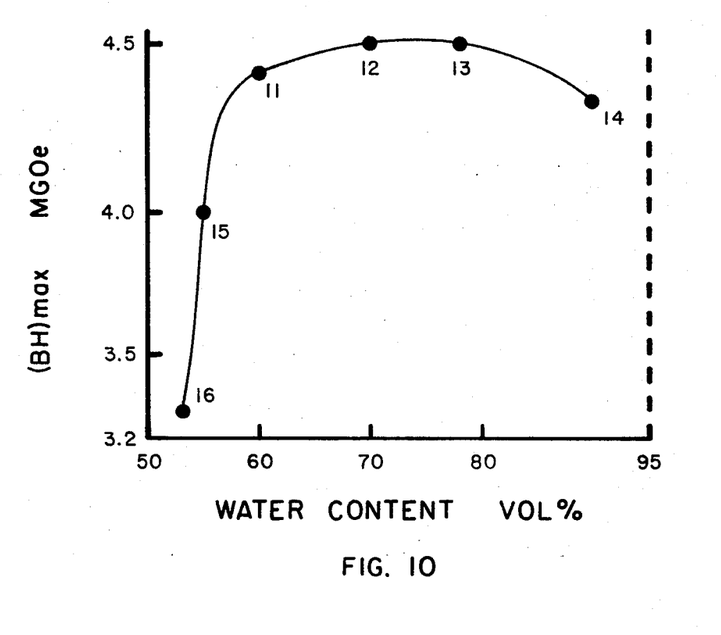
FIG. 10 is a plot of maximum energy product of the fully sintered magnets as a function of the water content of the slurry prior to pressing and orienting.

The following five examples are offered in order to show the effect of the slurry water content for the case that water is used as the liquid component of the slurry. The water content was determined by completely drying a test sample of the slurry and by weighing the sample before and after drying. Sintered magnets were made precisely as in Example 11, except that the water content of the slurry was varied. The test results are seen from Table III and FIG. 10.

TABLE III.—EFFECT OF SLURRY WATER CONTENT

| Example | Water content (vol. percent) | Approximate consistency of slurry | Rate of pressing (p.s.i./sec.) | $B_r$ (gauss) | $H_{ci}$ (oersted) | $(BH)_{max}$ (MGOe) |
|---|---|---|---|---|---|---|
| 11 | 60 | Soft mud | 150 | 4,260 | 2,650 | 4.4 |
| 12 | 70 | Soft ice cream | 110 | 4,290 | 2,600 | 4.5 |
| 13 | 78 | Pancake mix | 60 | 4,280 | 2,700 | 4.5 |
| 14 | 90 | Chocolate milk | 15 | 4,240 | 2,750 | 4.3 |
| 15 | 56 | Soft mud | 190 | 4,150 | 2,850 | 4.0 |
| 16 | 53 | Hard mud | 220 | 3,820 | 2,900 | 3.3 |

The column "Approximate Consistency of Slurry" gives a qualitative description of the viscosity of the slurry prior to pressing. The numbers in FIG. 10 refer to the number of the example. It is noted that the method of the invention does not work properly if the water content is below 55 vol. percent. Evidently, the ferrite crystals can not be aligned properly in a slurry having a consistency of a "hard mud." The dashed line in FIG. 10 at 95 vol. percent water indicates the other limit, at which the method of the invention no longer works properly. If the water content is higher than 95 vol. percent, the slurry is very difficult to press. If water is used for the liquid component of the slurry, the water content should be between 55 vol. percent and 95 vol. percent.

EXAMPLE 17

A sintered magnet was made precisely as in Example 12, except that barium ferrite slurry was used which was made as follows: 19.0 wt. percent barium carbonate, $BaCO_3$, 0.3 wt. percent silica, $SiO_2$, 0.2 wt. percent alumina, $Al_2O_3$, and 0.2 wt. percent calcia, $CaO$, were mixed in the wet condition for 4 hours in a ball mill with 80.3 wt. percent ferric oxide $Fe_2O_3$. The slurry was dried by evaporating the water.

The dried cake was presintered for 1 hour at 1240° C. The presintered clinker was broken up and wet-milled for 8 hours in an attritor with steel balls. The milled slurry was dewatered until it had a "soft ice cream consistency" and a water content of 70 vol. percent. The remanence of the sintered magnet was $B_r=4280$ gauss, the coercive force $H_{ci}=2350$ oersted, and the maximum energy product $(BH)_{max}=4.4$ MGOe. This example shows that similar magnets can be made by using barium ferrite instead of strontium ferrite.

In order to determine how fast the green ferrite magnet bodies of Example 17 can be removed without breakage, the continuous, self-cleaning filter belt illustrated in FIG. 5 was built as follows: Every sixth link of a standard No. 41 roller chain was removed and was replaced by a standard roller chain attachment with one lug on one side. Holes were melted through along each side of a long piece of polypropylene multifilament filter cloth at a spacing approximately 30% larger than the spacing of the roller chain attachments. The filter cloth was bolted through the holes to the lugs of the roller chain, one chain on each of the two sides of the filter cloth. The pair of roller chains was mounted on five pairs of sprockets as indicated in FIG. 5 with one pair of sprockets being driven by an electric gear motor. A wooden washing tank was constructed with rows of brushes mounted in the tank. A wooden drum was placed between the pair of sprockets 29 (see FIG. 5) so that the filter cloth was pressed tight against the brushes immersed in water. It was found that the green ferrite bodies could be transported out of the gap of the electromagnet at a rate of 2 inches/sec. without breakage. Of course, higher rates can be used if needed, for example, by adding a large amount of a binder to the slurry. It was further found, that the filter belt cleaned itself sufficiently so that the pressing and orienting cycle could be repeated continuously. There was no sticking of the green ferrite bodies to the polypropylene filter belt.

EXAMPLE 18A

An oriented, plastic-bonded ferrite magnet was made as follows: Sintered ferrite magnets were made precisely as in Example 12. The sintered magnets were crushed into a powder passing through a 10-mesh screen. 95 wt. percent of the powder was mixed with 3 wt. percent epoxy resin Epon 815 and with 2 wt. percent epoxy catalyst Versamid 125. The mixture was pressed at a pressure of 30,000 p.s.i. in a magnetic field of 8000 oersted. The pressed compact was cured for 10 minutes at 150° C. resulting in a strong, rigid, plastic-bonded magnet. The remanence of the magnet was 2850 gauss, the coercive force $H_{ci}=2500$ oersted, and the maximum energy product $(BH)_{max}=1.9$ MGOe.

EXAMPLE 18B

An oriented, plastic-bonded magnet was made precisely as in Example 18A, with the exception that the end portions 41 (see FIG. 7) were used instead of the central portion. The remanence of the plastic-bonded magnet was $B_r=2870$ gauss, the coercive force $H_{ci}=2550$ oersted, and the maximum energy product $(BH_{max}=1.9$ MGOe. This example shows that a plastic-bonded magnet made from the end portions of the green ferrite magnet body is essentially identical to the one made from the central portion (Example 18A). The second quadrant of the hysteresis loop is compared in FIG. 8 with that for the fully sintered magnet. Although the demagnetization curve of the oriented plastic-bonded magnet is below that of the fully sintered magnet, it will be appreciated that the oriented plastic-bonded magnet is useful in many applications because it can be made, for example, in shapes that are impractical for the sintered magnet. The plastic-bonded magnet of Example 18B is greatly superior to the plastic-bonded magnets now used in holding devices and electric motors.

EXAMPLE 19A

An unoriented, plastic-bonded magnet was made as follows: Sintered magnets were made as described in Example 17. The magnets were crushed and pulverized into a powder passing through a 10-mesh screen. 12 gm. of the powder was mixed with 0.3 gm. epoxy resin Epon 815, and 0.2 gm. epoxy catalyst Versamid 125. The mixture was pressed at a pressure of 15,000 p.s.i. without a magnetic field. The compact was cured for 10 minutes at a temperature of 150° C. into a strong, plastic-bonded magnet. The remanence of the magnet was $B_r=2150$ gauss, the coercive force $H_{ci}=2450$ oersted, and the maximum energy product $(BH)_{max}=MGOe$.

EXAMPLE 19B

An unoriented, plastic-bonded magnet was made precisely as in Example 19A, except that the end portions 41 (see FIG. 7) were used instead of the central portion. The remanence of the magnet was $B_r=2160$ gauss, the coercive force $H_{ci}=2500$ oersted, and the maximum energy product $(BH)_{max}=1.1 MGOe$—essentially the same values that were obtained by processing the central portion of the green ferrite magnet body. Although (see FIG. 8) the demagnetization curve for the unoriented, plastic-bonded magnet is below that of the oriented plastic-bonded magnet, it will be appreciated that there are many applications for this magnet because of the rapid speeds with which it can be molded. For example, this magnet can be extruded at a rate of 1 foot per second which is not possible with the oriented magnet.

As these examples and FIG. 8 show, it is possible to manufacture magnets having exceptionally good characteristics with the simple procedure encompassed by the invention. The process of pressing and orienting green ferrite bodies can be completely automated. No expensive dies are needed. No gaskets are needed to contain the slurry. No sticking problems are encountered. The slurry does not come in contact with metallic surfaces. Pressing times are considerably reduced. Large and highly oriented magnets can be made which was not possible with the prior-art processes. All portions of the green ferrite magnet bodies can be used for making superior ferrite magnet powder. The powder can be used, among other, in the manufacture of superior plastic-bonded magnets.

While we have described our invention in connection with specific examples and specific embodiments, other modifications thereof will be readily apparent to those skilled in the art without departing from the spirit and scope of this invention as defined in the appended claims.

We claim as our invention:

1. In the method of making ferrites, the steps comprising placing slurry of finely divided ferrite material containing between 55 vol. percent and 95 vol. percent water on a filter cloth into the gap between two pole faces of an electromagnet, said filter cloth being larger than said pole faces and moveable essentially parallel to said pole faces, reducing the distance between said pole faces, and concurrently subjecting said slurry to a strong magnetic field, pressing out part of the liquid of said slurry and forming a green ferrite body at an end pressure of above 400 p.s.i. with the edges of the ferrite body free from close mechanical restraint during pressing, increasing the distance between said pole faces, moving said filter cloth with said green ferrite body out of said gap, and sintering at least a portion of said green ferrite body.

2. The method of claim 1, wherein the sintered portion is crushed into a powder.

3. In the method of making ferrites, the steps comprising placing slurry of finely divided ferrite material containing between 55 vol. percent and 95 vol. percent water upon a moveable filter cloth then transporting it into the gap between two pole faces of an electromagnet, reducing the distance between said pole faces through the action of at least one hydraulic cylinder, and concurrently subjecting said slurry to a strong magnetic field and having a large force counteracting the magnetic attraction force between said two pole faces, pressing out part of the liquid of said slurry and forming a green ferrite body at an end pressure of at least 500 p.s.i. with the edges of the ferrite body free from close mechanical restraint during pressing, increasing the distance between said pole faces, moving said filter cloth with said green ferrite body out of said gap, and sintering at least a portion of said green ferrite body.

4. The method of claim 3 wherein the filter cloth is larger than said pole faces and is peripherally held against one pole face forming a sealed pocket containing the slurry.

5. In the method of making ferrites, the steps comprising placing sulrry of finely divided ferrite material against a filter cloth into the gap between two pole faces of an electromagnet and sealing the peripheral edges of said filter cloth against one of said pole faces to form a slurry-containing pocket, said slurry containing between 55 vol. percent and 95 vol. percent water, said filter cloth being moveable, reducing the distance between said pole faces, and concurrently subjecting said slurry to a strong magnetic field, pressing out part of the water and forming a green ferrite body at an end pressure of between 500 p.s.i. and 10,000 p.s.i., increasing the distance between said pole faces, moving said filter cloth with said green ferrite body out of said gap, and sintering at least a portion of said green ferrite body.

6. The method of claim 5 wherein the filter cloth is part of a filter belt which moves to provide clean filter surface for successive pressings.

7. The method of claim 5, wherein the sintered portion is crushed into a powder.

8. In the method of making ferrites, the steps comprising placing slurry of finely divided ferrite material containing between 55 vol. percent and 95 vol. percent water against a filter cloth into the gap between at least two pole structures of an electromagnet, said filter cloth being larger than any of the pole faces, sealing the sluury by moving a frame so as to hold the filter cloth against at least one pole structure about the slurry, said frame fitting loosely around at least another pole structure, reducing the distance between said pole structures, and concurrently subjecting said slurry to a strong magnetic field, pressing out part of the liquid of said slurry, and forming a green ferrite body at an end pressure of at least 500 p.s.i., moving back said frame, increasing the distance between said pole structures, moving said filter cloth with said green ferrite body out of said gap, and sintering at least a portion of said green ferrite body.

9. The method of claim 8 wherein the filter cloth is part of a filter belt which in moving presents clean filter surface for successive pressings and wherein a large force is provided for counteracting the magnetic attraction force between said pole structures.

10. The method of claim 8, wherein the sintered portion is crushed into a powder having a particle size capable of passing through a 10-mesh screen.

11. In the method of making ferrites, the steps comprising placing slurry of finely divided ferrite material having an average particle size of the order of 1 μm. against a filter cloth into the gap between two pole structures of an electromagnet, the slurry being composed of from 55 vol. percent to 95 vol. percent water, said filter cloth being part of a filter belt, sealing said slurry by moving a nonmagnetic frame against a first pole structure to carry the filter cloth into engagement with said first pole structure, said frame fitting loosely around the other pole structure, reducing the distance between said pole structures, and concurrently subjecting the slurry to a strong magnetic field, pressing out part of the liquid of said slurry at an end pressure of from about 500 p.s.i. up to about 10,000 p.s.i. and forming a green ferrite body, moving back said frame, increasing the distance between said pole structures, moving said filter cloth with said green ferrite body out of said gap, and sintering at least a portion of said green ferrite body.

References Cited
UNITED STATES PATENTS

| | | | |
|---|---|---|---|
| 1,031,190 | 7/1912 | Liebau | 264—82 |
| 3,298,882 | 1/1967 | Waugh et al. | 264—86 |
| 3,412,461 | 11/1968 | Cochardt | 264—DIG. 58 |
| 3,452,121 | 6/1969 | Cochardt et al. | 264—24 |
| 3,602,287 | 8/1971 | Eversdyk | 264—87 |
| 3,634,559 | 1/1972 | Haes et al. | 264—24 |

JOHN H. MILLER, Primary Examiner

U.S. Cl. X.R.

264—61, 87, 108, Digest 58

UNITED STATES PATENT OFFICE
CERTIFICATE OF CORRECTION

Patent No. 3,755,515      Dated August 28, 1973

Inventor(s) Philip A. Cochardt et al

It is certified that error appears in the above-identified patent and that said Letters Patent are hereby corrected as shown below:

Column 1, line 17, delete "oil" and substitute --die--. Same column, line 65, change "MGRe" to --MGOe--.

Signed and sealed this 9th day of April 1974.

(SEAL)
Attest:

EDWARD M. FLETCHER, JR.
Attesting Officer

C. MARSHALL DANN
Commissioner of Patents